June 9, 1925.
C. GIRL
BUMPER
Filed July 23, 1923
1,541,039
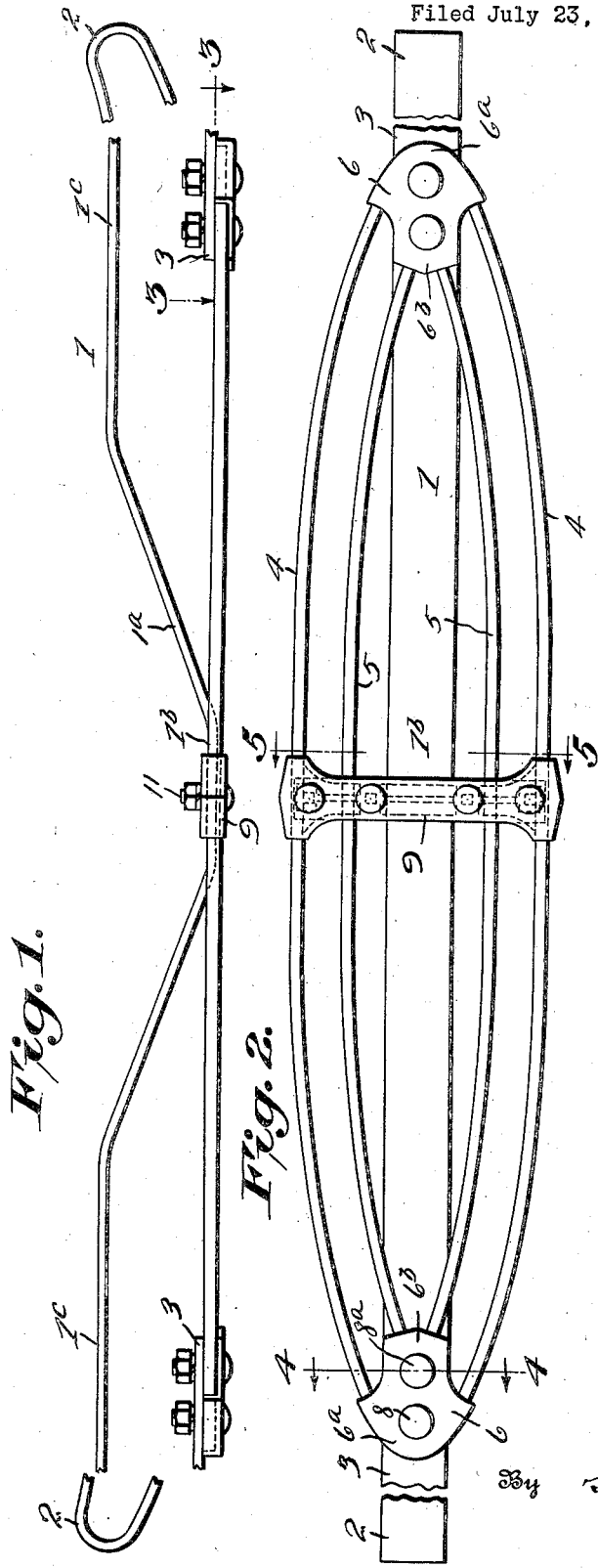
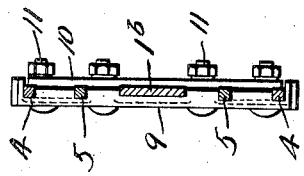
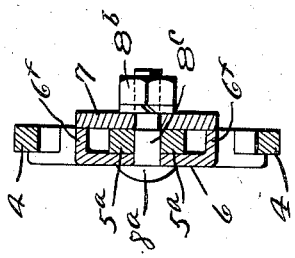
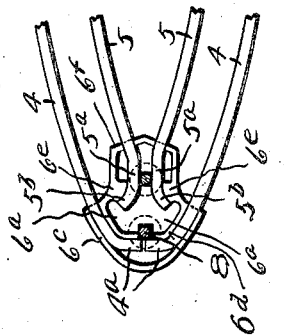
Inventor
Christian Girl,
By Hull, Buck & West,
Attorneys Patented June 9, 1925.

1,541,039

UNITED STATES PATENT OFFICE.

CHRISTIAN GIRL, OF KALAMAZOO, MICHIGAN, ASSIGNOR TO THE C. G. SPRING & BUMPER COMPANY, OF DETROIT, MICHIGAN, A CORPORATION OF DELAWARE.

BUMPER.

Application filed July 23, 1923. Serial No. 653,145.

*To all whom it may concern:*

Be it known that I, CHRISTIAN GIRL, a citizen of the United States, residing at Kalamazoo, in the county of Kalamazoo and State of Michigan, have invented a certain new and useful Improvement in Bumpers, of which the following is a full, clear, and exact description, reference being had to the accompanying drawings.

This invention relates to bumpers for automobiles and like vehicles, and has for its general object to provide a novel and effective construction for bumpers which will enable the latter to receive and withstand all ordinary blows or shocks to which such bumpers are liable. A further object of the invention is to produce a bumper of this kind which is attractive in appearance and relatively cheap to produce. Further and more limited objects of the invention will appear in the descriptive part of this specification and will be realized by the combinations of elements embodied in the claims.

In the drawings, forming a part thereof, Fig. 1 represents a plan view of a bumper constructed in accordance with my invention, the end portions being broken away; Fig. 2 a front elevation of the bumper shown in Fig. 1; Fig. 3 a detail in section corresponding to the line 3—3 of Fig. 1; and Figs. 4 and 5 sectional details corresponding respectively to the lines 4—4 and 5—5 of Fig. 2.

Describing the various parts by reference characters, 1 denotes generally a rear or auxiliary section of my bumper, the said section comprising a bar, preferably a continuous spring plate, having its central portion projected forwardly in a flattened V-shape, as shown at $1^a$ and $1^b$, the end portions of the plate being bent into loops 2, the front ends 3 of the plate projecting toward each other but being spaced apart. On opposite sides of the central portion, the bar 1 is provided with transversely extending portions $1^c$ each constituting a member for receiving a clip or other means for attaching the bumper to the side members (not shown).

The front ends of this rear or auxiliary bar support the opposite ends of a widened impact-receiving section. This impact-receiving section consists generally of a plurality of curved vertically spaced bars, four such bars being shown, preferably square in section, and forming, when assembled, a long, oval, impact section. The external top and bottom bars 4 are substantially identical in construction but are oppositely placed, so that the convex portion of one bar is presented upwardly and the other downwardly. Each of these bars is provided with ends $4^a$ which project substantially at right angles to the length of the bumper, the ends of the opposed bars being presented toward each other (see Fig. 3).

Within the uppermost and lowermost bars 4 are located the intermediate bars 5. Each of these bars extends substantially parallel with the bar above and below the same, respectively, and each is provided with an end comprising a portion $5^a$ which extends substantially parallel with the longitudinal axis of the bumper and with an extreme end portion $5^b$ projecting upwardly at each end of the outer bar 5 and downwardly at each end of the lower bar. The bars 5 are identical in construction, but are reversely arranged, as is the case with the bars 4.

In order to anchor the bars 4 and 5 to the ends 3 of the rear or auxiliary bar, the following construction is provided:—

6 denotes a pair of outer or front clamping plates each having a rounded outer end $6^a$ and a relatively narrow inner end $6^b$. The rounded end portion $6^a$ of each of these plates is provided with a rearwardly extending marginal flange $6^c$ which is adapted to receive therein and contact with the curved ends of the bars 4. Each of these plates also has formed therewith a rearwardly extending flange $6^d$ which is of such shape as to contact with both the curved end portions and the extreme end portions $4^a$ of the bars 4. In addition, each plate 6 is provided with projections $6^e$ which are curved in such manner as to form and receive the curved upper and lower faces of the ends $5^b$ of the bars 5, respectively. The inner portion of each plate $6^a$ is provided with a marginal rearwardly directed flange $6^f$ which is provided with slots for the reception of the bars 5.

In practice, the end portions of the bars 4 and 5 can be inserted into the seats formed for the same in their respective plates 6, after which they will be secured in place by a rear cover plate 7, which is secured to the front plate 6 by means of bolts 8, $8^a$ and nuts $8^b$. The bolt $8^a$ has a squared body $8^c$ opposite faces of which engage the adjacent faces of the parts 5ª and hold the opposite faces of such parts in engagement with their respective seats 6ᵉ.

The central portion 1ᵇ of the rear or auxiliary bar 1 is deflected forwardly a sufficient distance to align it with the bars 4 and 5, whereby the central portions of said bars may be conveniently clamped together and the rear bar serve as a truss for the front or impact section. The clamp is shown in detail (Figs. 1, 2 and 5), and comprises an ornamental front plate 9 having recessed seats projecting forwardly from the rear face thereof for the parts 4, 5 and 1ᵇ, with a rear plate 10 clamped to the front plate by means of bolts 11 located between the bars 4 and 5 and between the last mentioned bars and the plate 1.

The construction illustrated and described herein provides a simple and efficient bumper of the type having a widened central impact portion; and one which can be conveniently and quickly assembled and disassembled and which is adapted to withstand all of the ordinary incidents of use.

Having thus described my invention, what I claim is:—

1. A bumper comprising a rear or auxiliary section including a bar having its ends bent forwardly and spaced from each other, and a central impact section comprising a plurality of bars each secured at its ends to the ends of the first-mentioned bar, the impact section comprising an upper and a lower bar having their central portions vertically spaced, and also a pair of intermediate bars having their central portions vertically spaced.

2. A bumper having a pair of attaching members and an impact section comprising an upper and a lower bar having their central portions vertically spaced and also a pair of intermediate bars having their central portions vertically spaced, and means for supporting said bars from said members.

3. A bumper comprising a rear or auxiliary section including a bar having its ends bent forwardly and spaced from each other, and a central impact section comprising an upper and a lower bar having their central portion vertically spaced, and also a pair of intermediate bars having their central portions vertically spaced, the central portion of the rear or auxiliary bar being projected between the central portions of the said intermediate bars, front and rear clamping plates securing the central portions of all of said bars together, and means securing the ends of the impact bars to the ends of the auxiliary bar.

4. A bumper comprising a pair of attaching members and an impact section, said impact section comprising an upper and a lower bar having their central portions vertically spaced, and a pair of intermediate bars also having their central portions vertically spaced, plates each having seats adapted to receive the adjacent ends of the bars of the impact section and to interlock with such ends, a clamping plate adapted to be secured to each of the first-mentioned plates thereby to lock the ends of said bars within said seats, and means for securing the said plates together and to the said members.

5. In a bumper, the combination of a pair of attaching members and an impact section extending across the space between such members, said impact section comprising an upper bar having its central portion projected upwardly, and also a bar having its central portion projecting downwardly, and an upper and a lower intermediate bar having their central portions projected upwardly and downwardly, respectively, the extreme ends of the upper and lower bars being directed toward each other and the extreme ends of the intermediate bars being bent away from each other, a clamping member for each end of the impact section and having seats adapted to receive and interlock with the ends of the bars of such section, a cover plate cooperating with each of the clamping plates, and means for securing the said plates together and to the said members.

6. In a bumper, the combination of a pair of attaching members and an impact section extending across the space between such members, said impact section comprising an upper and a lower external bar, and an upper and a lower intermediate bar, the extreme ends of the upper and lower bars being directed toward each other and the extreme ends of the intermediate bars being bent away from each other, a clamping member for each end of the impact section and having seats adapted to receive and interlock with the ends of the external bars and seats adapted to engage the top and bottom surfaces of the ends of the intermediate bars, respectively, a cover plate for each clamping plate, and means for securing the said plates together and to the said members, said means including a bolt extending between and engaging the bottom and top surfaces of the ends of the top and bottom intermediate bars, respectively.

7. A bumper comprising a section including a rear or auxiliary bar or plate having its ends bent forwardly or toward each other and its central portion deflected forwardly, and an impact section extending between the ends of the auxiliary bar and comprising upper and lower symmetrical bars having their central portions projecting upwardly and downwardly respectively, and intermediate upper and lower symmetrical bars having their central portions projecting upwardly and downwardly, respectively, means for connecting the ends of said bars to the ends of the auxiliary bar or plate, a clamping plate having seats therein for the central portions of said bars and the central portion of the auxiliary bar or plates, and a cooperating clamping plate secured to the first mentioned plate.

8. A bumper having an impact section comprising external upper and lower bars having their intermediate portions vertically spaced and intermediate upper and lower bars having their intermediate portions vertically spaced from each other and from the first mentioned bars, and means for supporting the ends of said impact section for attachment to a vehicle frame.

9. A bumper having an impact section comprising external upper and lower bars having their intermediate portions vertically spaced and intermediate upper and lower bars having their intermediate portions vertically spaced from each other and from the first mentioned bars, and means for supporting the ends of said impact section for attachment to a vehicle frame, the said bars being substantially square in section.

In testimony whereof, I hereunto affix my signature.

CHRISTIAN GIRL.